(No Model.)

R. A. SMITH & G. CHASE.
GRAIN SEPARATOR.

No. 254,574. Patented Mar. 7, 1882.

Attest:
Courtney A. Cooper
H. E. Hansmann

Roderick A. Smith
George Chase
By their Atty
Chas. E. Foster

UNITED STATES PATENT OFFICE.

RODERICK A. SMITH AND GEORGE CHASE, OF OKOBOJI, IOWA.

GRAIN-SEPARATOR.

SPECIFICATION forming part of Letters Patent No. 254,574, dated March 7, 1882.

Application filed June 23, 1881. (No model.)

*To all whom it may concern:*

Be it known that we, RODERICK A. SMITH and GEORGE CHASE, of Okoboji, Dickinson county, Iowa, have invented certain new and useful Improvements in GrainSeparators, of which the following is a specification.

Our invention relates to that class of grain-separators, such as was patented to us on the 22d day of October, 1878, in which revolving rollers catch and throw out the extraneous matter; and our invention consists of certain appliances combined with recessed rollers for rendering the operations more effective than those heretofore used.

Figure 1:
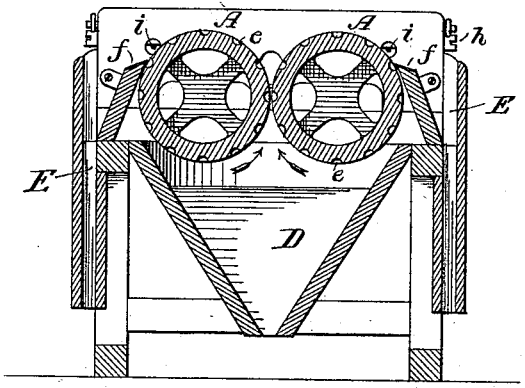
Figure 2:
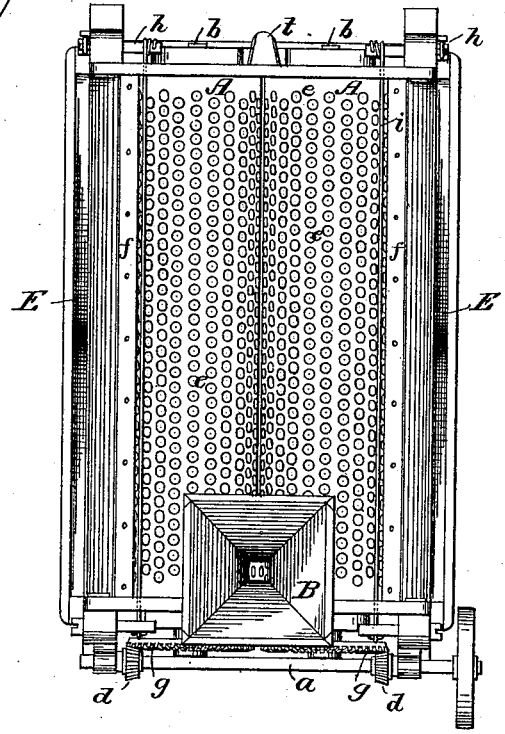

In the drawings, Figure 1 is a transverse sectional elevation of our improved grain-separator, and Fig. 2 is a plan view.

The frame consists of uprights and cross-pieces supporting the bearings of a driving-shaft, $a$, and two inclined roller-shafts, $b$, each carrying a roller, A, containing pits or indentations $e$ in the surface, and each having a bevel-gear, $g$, meshing with a bevel-pinion, $d$, on the driving-shaft. Above the highest ends of the rollers is a hopper, B, and at the outer side of each roller is a parallel inclined plate, $f$, arranged below a wire, $i$, drawn tightly by turn-pins $h$ passing through the frame, said wire being parallel to the face of its adjacent roller and a short distance therefrom. Beneath the rollers is a receptacle, D, and outside each plate $f$ is a receptacle, E. The rollers are geared to both, and revolve in the direction shown by the arrows, Fig. 1, and the pits are of such a depth and shape as to receive the extraneous matter, as cockle, but not the wheat or other grain from which such matter must be separated, and the wires $i$ are arranged at such distances from the rollers as to permit the particles projecting in the pits to pass freely beneath them, when they will be carried round below the plates $f$ and deposited in the receptacle D.

Should a grain of wheat get endwise into one of the pits it may be carried round with the cockle, in which case the projecting end will pass under the wire $i$, drawing the latter slightly downward, so that in flying back to its position, as it does when the grain passes from it, the wire will release the grain so suddenly that it will fly laterally into the adjacent receptacle, E. By this means, without the bearings, shafts, beaters, and driving-gear heretofore employed, we are enabled to separate one class of particles from the other rapidly, cheaply, and effectively.

Any suitable wire-tightening devices may be used for keeping the wires $i$ taut, and the rollers may be corrugated or indented in any manner that the substances operated with render desirable.

We claim—

1. In a grain-separator, the combination, with the pitted rollers, of wires $i$, stretched parallel to the faces of the rollers, substantially as and for the purpose set forth.

2. The combination of the inclined pitted rollers A A, wires $i$ $i$, and receptacles D and E, substantially as set forth.

In testimony whereof we have signed our names to this specification in the presence of two subscribing witnesses.

RODERICK A. SMITH.
    GEORGE CHASE.

Witnesses:
 WILLIAM CHASE,
 W. F. PILLSBURY.